United States Patent

Riester

[15] 3,660,102
[45] May 2, 1972

[54] SILVER HALIDE EMULSIONS SENSITIZED WITH METHINE DYES CONTAINING A THIOSULFATOALKYL GROUP

[72] Inventor: Oskar Riester, Leverkusen, Germany

[73] Assignee: Agfa-Gevaert Aktiengesellschaft, Leverkusen, Germany

[22] Filed: Apr. 1, 1970

[21] Appl. No.: 24,867

[30] Foreign Application Priority Data

Apr. 2, 1969 Germany.....................P 19 16 845.7

[52] U.S. Cl.....................................96/127, 96/128, 96/131, 96/132, 96/133, 96/135, 96/137, 96/138, 96/140
[51] Int. Cl. .........................................G03c 1/10, G03c 1/18
[58] Field of Search....................96/132, 133, 134, 137, 140, 96/142, 127

[56] References Cited

UNITED STATES PATENTS 2,410,690  11/1948  Smith et al................................96/131
2,537,880  1/1951   Dent et al. ...............................96/131
3,369,902  2/1968   Abbott......................................96/137

*Primary Examiner*—J. Travis Brown
*Attorney*—Connolly and Hutz

[57] ABSTRACT

Light-sensitive photographic silver halide emulsions can be spectrally sensitized by new monomethine or polymethine dyes which are hydrophilized by at least one thiosulfatoalkyl group of the formula $$-(CH_2)_n-S-SO_3H \text{ with } n = 1 \text{ to } 6.$$

These new dyes are prepared by reacting suitable heterocyclic bases with an excess of $\alpha,\omega$-dihalogenalkanes to form the 1:1 addition products from which are formed the heterocyclic $\omega$-thiosulfatoalkyl quaternary salts the latter being a suitable intermediate product for condensation reactions to form the new dyes according to known methods.

1 Claims, No Drawings

SILVER HALIDE EMULSIONS SENSITIZED WITH METHINE DYES CONTAINING A THIOSULFATOALKYL GROUP

The present invention relates to a light-sensitive photographic material, which comprises at least one silver halide emulsion layer and is spectrally sensitized by means of new hydrophilic monomethine or polymethine dyes containing at least one thiosulfatoalkyl group.

It is common practice to impart to photographic emulsions an increased sensitivity to light or to particular spectral ranges of light by adding to these emulsions certain dyes (so called spectral sensitizers). Preferably are used for this purpose monomethine or polymethine dyes of various types of which a large number has proved to be suitable. Furthermore, it has been found to be especially advantageous, to use for the purpose of sensitizing such monomethine or polymethine dyes which have water-solubilizing groups, for these dyes show some very superior qualities, as, for example, high intensity of sensitization, good compatibility with other common additives as color coupler, wetting agents, stabilizers and so on, as well as a good ability to wash out, which latter property is very important in order to obtain good whites.

Especially those polymethine dyes have become important in the art of sensitizing which can be prepared according to methods commonly known in the chemistry of cyanines starting with the products of the reaction of heterocyclic nitrogen containing bases within sultones. These dyes contain sulfoalkyl groups and are described for example in the German patent No. 929,080. In a similar way are obtained other dyes, which, for example, have a ω-sulfatoalkyl group, if the heterocyclic bases are reacted with alkylenesulfates (East German Patent No. 15 119). The same dyes can also be prepared, according to the U.S. Pat. No. 2,537,880, if methine dyes having ω-hydroxyalkyl groups, are reacted with concentrated sulfuric acid.

The spectral sensitizers have to meet high requirements and are to be used in most different photographic emulsions whereby compatibility with a great number of additives must be given. Therefore it is very desirable to have at hand some classes of dyes, from which at any given case a particular dye may be selected.

The discovery of new classes of dyes is very desired because some of the known sensitizers have disadvantages. The above ω-sulfatoalkyl methine dyes, for example, tend to be hydrolyzed, and this tendency can be seen already in the preparation of the dyes in a reverse cleavage to form back the ω-hydroxyalkyl cyanine dyes.

It is an object of the present invention to provide new cyanine and merocyanine dyes having hydrophilic groups which are useful spectral sensitizers for photographic materials.

New monomethine and polymethine dyes have now been prepared which contain at least one ω-thiosulfatoalkyl group of the following formula $$-(CH_2)_n-S-SO_3^{\ominus}$$

wherein $n$ represents an integer from 1 to 6.

The new dyes correspond to one of the following formulas A and B

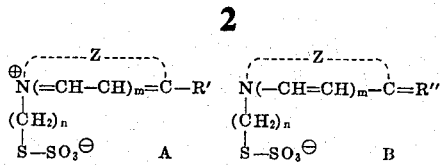

wherein
Z represents the atoms necessary to complete a heterocyclic group containing a 5- or 6-membered heterocyclic ring; suitable heterocyclic groups are, for example, groups of the oxazole series, such as oxazole, benzoxazole or naphthoxazole, of the thiazole series such as thiazole, benzothiazole, α-naphthothiazole or β-naphthothiazole, of the selenazole series, such as selenazole, benzoselenazole, or naphthoselenazole, of the thiadiazole, thiazoline, imidazole, indoline, pyridine and 2-quinoline or 4-quinoline series. These heterocyclic groups can be further substituted, for example, with halogen such as fluorine, chlorine, bromine or iodine, alkyl, alkoxy, alkylthio, alkylamino, acylamino, sulfonylamino, aralkyl, aryl, furyl, thienyl, trifluoroalkyl or alkylsulfonyl.

R' represents a chain of 1,3 or 5 methine groups, which chain can contain side chains having up to 3 carbon atoms and which chain is substituted at a terminal position with a heterocyclic group containing a 5- or 6-membered heterocyclic ring, for example, a group of the oxazole series, such as oxazole, benzoxazole or naphthoxazole, of the thiazole series, such as thiazole, benzothiazole, α-naphthothiazole or β-naphthothiazole, of the selenazole series such as selenazole, benzoselenazole or naphthoselenazole, of the thiadiazole, thiazoline, imidazole, benzimidazole, indoline, pyridine, 2-quinoline or 4-quinoline series. The heterocyclic groups can be further substituted, for example , with halogen such as fluorine, chlorine, bromine or iodine, allyl, trifluoroalkyl, alkoxy, aryl, aralkyl, alkylthio, alkylamino, acylamino or sulfonylamino, furyl, thienyl, alkylsulfonyl; preferably the heterocyclic groups can contain at the nitrogen atom an alkyl substituent such as alkyl, ω-sulfoalkyl, ω-sulfatoalkyl, ω-thiosulfatoalkyl, N-acylsulfonylalkyl, N-sulfonylsulfamylalkyl, phosphoric acid alkyl, sulfonylaminoalkyl, acylaminoalkyl or hydroxyalkyl.

R" represents a methine chain containing 2 or 4 methine groups which methine chain can contain as a side chain an alkyl or alkoxy group having up to three carbon atoms and is substituted at a terminal position with a ketomethylene residue commonly used in the chemistry of cyanine dyes, for example a residue of the rhodanine, oxazolidonthione, thiohydantoine, thiobarbituric acid or pyrazolone series or R" represents a residue commonly used in the chemistry of cyanine dyes, for example a residue of the rhodanine oxazolidonthione, thiohydantoine, thiobarbituric acid or pyrazolone series.

$m$ is 0 or 1.

$n$ represents an integer from 1 to 6.

The compounds of the following formulas, for example are useful sensitizers according to the present invention:

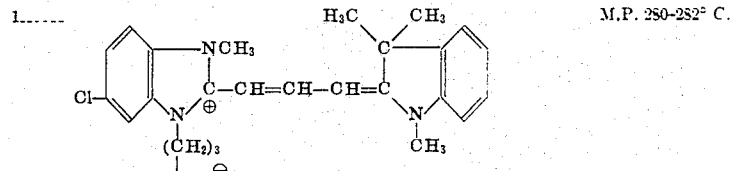

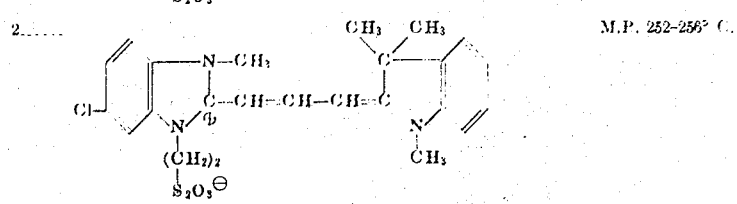

3. 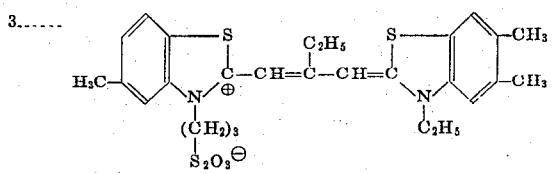 M.P. 259-262° C.

4. 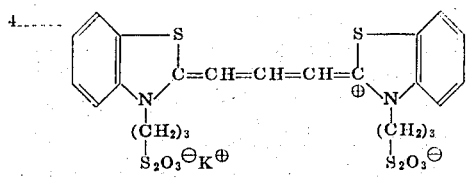 M.P. 229-234° C.

5. 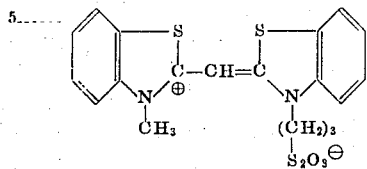 M.P. über 290° C.

PAT. No.: 3660102—F. 80

6. 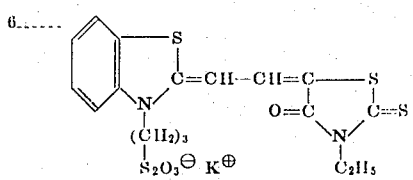 M.P. 201-202° C.

7. 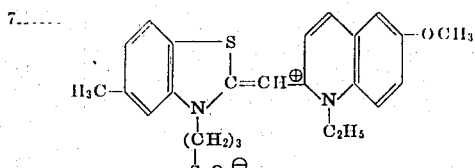 M.P. über 290° C.

8. 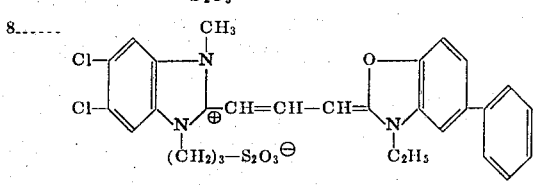 M.P. 270-272° C.

9. 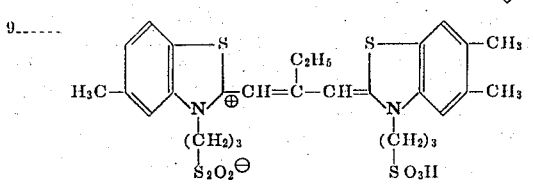 M.P. 247-252° C.

In order to prepare the cyanine dyes of the present invention there are reacted in a first reaction step α,ω-dihalogenalkanes with suitable nitrogen containing heterocyclic bases in such a manner as to obtain the 1 : 1 condensation products. This addition reaction is performed according to the following general scheme:

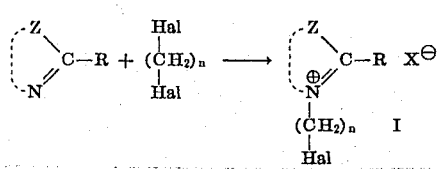

wherein Z and n have the same meaning as mentioned above.

R represents a reactive group, commonly used in the chemistry of cyanine dyes, for example an alkyl or alkylthio group and preferably methyl or methylthio.

$X^{\ominus}$ represents an halide such as chloride or bromide or any other anion.

It has already been known that two moles of heterocyclic bases can be reacted with one mole of α,ω-dihalogenalkane to form bisquaternary salts, for example according to the following reaction scheme:

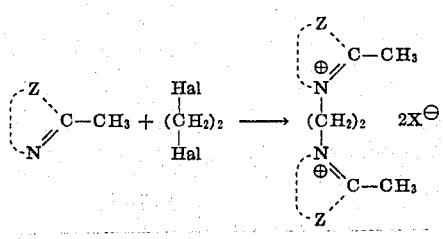

This reaction has been described, for example by G. Schwarz and P.F. de Smet, U.S. Pat. No. 2,595,195, by C.D. Wilson, U.S. Pat. No. 2,425,774 and by L.G.S. Brooker, U.S. Pat. No. 2,461,137.

Contrary to this known reaction the 1:1 addition can be performed very easily if a considerable excess of the halogen compound is used. In the process according to the present invention one mole of the heterocyclic base is reacted at 120°–200°C and preferably at 140°–160°C with 3 to 10 moles of α,ω-dihalogen-alkanes.

Furthermore it has been found that the monoquaternary salts which have been obtained in this way can be reacted in a second reaction step with alkali metal thiosulfates such as sodium thiosulfate, potassium thiosulfate or with ammonium thiosulfate to form betain-quaternary salts according to the following reaction scheme:

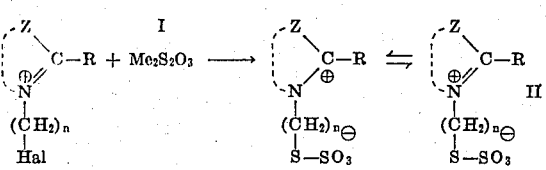

wherein the symbols have the same meaning as described above. $Me^I$ stands for an alkali metal atom preferably for sodium or potassium or for the ammonium ion.

The reaction of the monoquaternary salts with the thiosulfates proceeds very easily and under gentle conditions. It is very remarkable that this reaction proceeds in a simple way already in the presence of water because as it is known that, such quaternary salts tend to be hydrolyzed with cleavage of the heterocyclic ring.

The preparation of the $n$-ω-thiosulfatoalkyl-quaternary salts of the formula II may be explained by the following example:
First Step 64 g of 2-methylbenzothiazole together with 120 ml of 1,3-dibromopropane are heated with stirring for 5 hours to 150°C (temperature of the heating bath). The reaction mixture is allowed to stand over night and then the excessive dibromopropane is decanted off and the solid residue is heated together with 200 ml of chloroform to boiling temperature. The solution is filtered and mixed with a solution of 25 g of $NaClO_4$ in 60 ml of methanol. After 1 hour the precipitated colorless crystals are separated.
Crude yield: 34 g; melting point 170°C.

After recrystallization from methanol, yield 28.1 g; melting point 171°–173°C; from mother liquor is separated an other crop of 3.2 g; melting point 170°–172°C.
Second step 3.7 g of 2-methyl-3-ω-bromopropyl-benzothiazolium-perchlorate, dissolved in 10 ml of dimethylformamide are mixed with a solution of 3,5 g of sodium thiosulfate in 5 ml of water at 20°C. The solution is concentrated by evaporation under reduced pressure (10 Torr). The residue is triturated with ether, the ether is decanted and the residue is treated twice with 20 ml of acetone.
Yield: 4.2 g; melting point 170°C. After drying in a drying pistol the melting point is 202°–205°C.

Other intermediate products of the general formula II are prepared in an analogous manner. However, the relative amounts of the reactants as well as of the solvents and also the time and the temperature of the reactions can be varied in each case. The most suitable conditions of the reaction can easily be determined for each case by a few simple tests.

The preparation of the dyes according to the present invention may be explained by the following example:
Dye no. 1 is prepared in the following way:

1.2 g of 1,2-dimethyl-3-ω-thiosulfatopropyl-5-chlorobenzimidazolium-betain are heated with stirring together with 1.2 g of 1,3,3-trimethyl-2-formylmethylen-indoline in 15 ml of N-methylpyrrolidone and 1 ml piperidine for 2 hours at 130°C (temperature of the heating bath). After cooling the dye is precipitated with ether and the product which has been filtered with suction is triturated with a little amount of methanol.

Yield: 0.9 g, melting point 268°–275°C, after recrystallization from 600 ml methanol, melting point 280°–282°C.

The other dyes can be prepared in a similar way starting with suitable N-ω-thiosulfatoalkyl quaternary salts of the formula II according to methods commonly used in the chemistry of cyanine dyes.

The dyes according to the present invention have proved to be useful spectral sensitizers which can be used in any silver halide emulsions. Suitable silver halides are silver chloride, silver bromide or mixtures thereof, if desiered containing a small amount of silver iodide of up to 10 mols per cent. The silver halides may be dispersed in the usual hydrophilic compounds, for example, carboxymethylcellulose, polyvinyl alcohol, polyvinyl pyrrolidone, alginic acid and its salts, esters or amides or preferably gelatin.

The sensitizing dyes to be used according to the present invention are advantageously added to the photographic emulsion before the chemical ripening or before casting. The methods employed for this are generally known to persons skilled in the art. The sensitizing dyes are generally incorporated in the emulsion in the form of solutions, e.g., in alcohol or mixtures of alcohol and water. The solvents must, of course, be compatible with gelatin and must not have any adverse effects on the photographic properties of the emulsion. Water, methanol or mixtures thereof are generally used as solvents. The quality of sensitizing dye added may vary within wide limits, e.g., between 2 and 200 mg. preferably between 10 and 60 mg. per kg. of the silver halide emulsion. The concentration of dye may be adapted to the particular requirements, depending on the type of emulsion, the desired sensitizing effect etc. The most suitable concentration for any given emulsion can easily be determined by the usual tests employed in the art of emulsion making.

The emulsions may also contain chemical sensitizers, e.g., reducing agents such as stannous salts, polyamines such as diethylentriamine, or sulfur compounds as described in U.S. Pat. No. 1,574,944. Furthermore, salts of noble metals, such as ruthenium, rhodium, palladium, iridium, platinum or gold may be contained in the emulsions for chemical sensitization, as described in the article by R. Koslowsky, Z.Wiss.Phot. 46, 65–72 (1951). The emulsions may also contain, as chemical sensitizers, polyalkylene oxides, especially polyethylene oxide and derivatives thereof.

The emulsions according to the present invention may contain the usual stabilizers such as homopolar or salt-type compounds of mercury with aromatic or heterocyclic rings, such as mercaptotriazoles, simple mercury salts, sulfonium mercury double salts and other mercury compounds. Other suitable stabilizers are azaindenes, especially tetra- or pentaazaindenes, in particular those that are substituted with hydroxyl or amino groups. Compounds of this type are described in the article by Birr, Z.Wiss.Phot. 47, 2–58 (1952). Other suitable stabilizers include heterocyclic mercapto compounds, e.g., phenylmercaptotetrazole, quaternary benzothiazole derivatives and benzotriazole.

The sensitivity which is brought about by means of the sensitizing dyes according to the present invention is also maintained in the presence of color couplers which, for example upon color-forming development form yellow, magenta or cyan dyes it being immaterial whether the couplers have been added to the emulsion in form of an aqueous solution or in an emulsified form. It is also possible to use in combination with the sensitizers of the present invention without any adverse effect other dyes, for example azo dyes, such as those used in the azo dye bleach process, or antihalation or filter dyes. For this reason the sensitizers of the present invention are especially useful in color photographic emulsions.

The emulsions may be hardened in the usual manner, for example, with formaldehyde or by use of halogen-substituted aldehydes which contain a carboxyl group, e.g., mucobromic acid, diketones, methanesulfonic acid esters and dialdehydes.

In the following list as well as in the following examples the sensitizing property of the dyes according to the present invention may be explained.

Dye 1 sensitizes a silver bromide-ammonia-emulsion the maximum being at 549 nm.

Dye 2 sensitizes a silver bromide-ammonia-emulsion the maximum being at 545 nm.

Dye 3 sensitizes a silver bromide emulsion which contains 3 mole-percent of silver iodide the maximum being at 646 nm and the sensitization decreasing very steeply to longer wave lengths. This excellent sensitization is also maintained in the presence of 1-hydroxy-4-sulfo-N-octadecyl-2-naphthamide as cyan-forming color coupler.

Dye 4 sensitizes as silver bromide emulsion the maximum being at 603 nm.

Dye 5 produces a sensitization maximum at 456 nm.

Dye 6 sensitizes a silver bromide emulsion the maximum being at 595 nm and another weaker side maximum being at 545 nm.

Dye 7 sensitizes with a maximum at 550 nm. This maximum is considerably increased if ca. 10 percent by weight (related to the amount of sensitizer) of an hypersensitizer such as 2-(p-dimethyl-amino-styryl)-benzothiazole is used in addition to the sensitizer. The sensitization is also maintained in the presence of 1(3'-sulfo-4'-phenoxyphenyl)-3-heptadecylpyrazolone-5 as magenta forming color coupler.

Dye 8 sensitizes with a maximum at 560 nm. This effect is also maintained in the presence of color forming couplers such as 2-heptadecyl-7-sulfo-pyrazolo[1,5-a]benzimidazole or in the presence of developing agents such as hydroquinone.

Dye 9 sensitizes a high-speed silver bromide emulsion containing 5 mole-percent of silver iodide the maximum being at 656 nm. This sensitization is also maintained in the presence of the usual amount of a color coupler which forms on color forming development a cyan dye, for example 10 g of 1-hydroxy-[2'-(N-methyl-N-octadecylamino)-5'-sulfo]-2-naphthanilide per kg of emulsion.

EXAMPLE 1

A silver bromide-ammonia-emulsion containing per kg 20 g of silver and 2 mole-percent thereof in form of the iodide is devided in three parts. To the various parts are added per kg of emulsion $0.6 \cdot 10^{-4}$ moles of a sensitizing dye. The sensitizers of the present invention are compared with a sensitizing dye of the following formula (comparison dye):

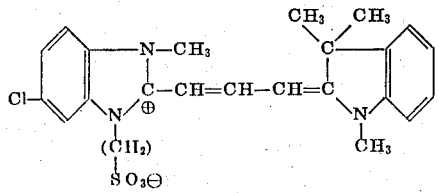

Each part is cast in known manner on a layer support. After drying the materials are exposed in a sensitometer behind a grey step wedge having $\sqrt{2}$-Stufen and behind a yellow filter which transmits light of wave lengths above 490 nm and are developed in common manner. The figure of the visible steps is a measure of the relative sensitivity. The following results are obtained:

| | |
|---|---|
| Dye 1 | 16 steps |
| Dye 2 | 15 steps |
| Comparison dye | 14 steps |

EXAMPLE 2

$0.65 \cdot 10^{-4}$ moles of dye 4 are added to 1 kg of a high-speed silver bromide emulsion containing per kg 0.25 moles of silver and about 5 mole-percent thereof in form of the iodide. To a second sample of the same emulsion is added the same amount of bis-(3-ethyl-2-benzothiazole)-trimethincyanine-iodide as comparison dye. The intensity of sensitization obtained by these two dyes is the same. However, the maximum of the sensitization brought about by the former sensitizer is shifted by 6 nm towards longer wave lengths and lies at 603 nm thereby effecting a higher sensitivity to red light. The gelatin layer after processing is colorless in the first case and is discolored if the comparison dye is used.

I claim:

1. A light-sensitive photographic material comprising a silver halide emulsion layer containing a dye of the group of cyanine and merocyanine dyes having one of the following A and B formulas:

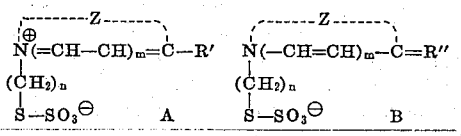

wherein

Z being defined as a 5–6 membered heterocyclic ring selected from the group consisting of oxazole, benzoxazole, naphthoxazole, thiazole, benzothiazole, α-naphthathiazole, β-naphthothiazole, selenazole, benzoselenazole, naphthoselenazole, thiazoline, imidazole, indoline, pyridine, 2-quinoline, and 4-quinoline unsubstituted or substituted with halogen, alkyl, alkoxy, alkylthio, alkylamino, acylamino, sulfonylamino, aralkyl, aryl, furyl, thienyl, trifluoroalkyl and alkylsulfonyl groups;

R' represents a chain of 1, 3 or 5 methine groups, side chains having up to three carbon atoms and which methine chain is substituted at a terminal position with a heterocyclic group containing a 5- or 6-membered heterocyclic ring, selected from the group consisting of benzoxazole or naphthoxazole, benzothia-zole, α-naphthothiazole or β-naphthothiazole, benzoselen-azole or naphthoselenazole, thiadiazole, thiazoline, imidazole, benzimidazole, indoline, pyridine, 2-quinoline or 4-quinoline unsubstituted or substituted with halogen, alkyl, trifluoroalkyl, alkoxy, aryl, aralkyl, alkylthio, alkylamino, acylamino or sulfonylamino, furyl, thienyl, alkylsulfonyl;

R'' represents a methine chain, containing two or four methine groups which methine chain can contain as a side chain an alkyl or alkoxy group having up to three carbon atoms and which chain is substituted at a terminal position with a ketomethylene residue selected of the group consisting of rhodanine, oxazolidonthione, thiohydantoine, thiobarbituric acid and pyrazolidone or R'' represents a ketomethylene residue selected of the group consisting of rhodanine, oxazolidonethione, thiohydantoine, thiobarbituric acid and pyrazolone;

$m$ represents 0 or 1; and $n$ represents an integer from 1 to 6.

* * * * *